United States Patent Office 3,252,813
Patented May 24, 1966

3,252,813
MINERAL-BOUND MATERIAL
Josef Cremer, Hermulheim, near Cologne, and Franz Rodis, Knapsack, near Cologne, Germany, assignors to Knapsack - Griesheim Aktiengesellschaft, Knapsack, near Cologne, Germany, a corporation of Germany
No Drawing. Filed Mar. 8, 1961, Ser. No. 94,123
Claims priority, application Germany, Mar. 16, 1960, K 40,180
1 Claim. (Cl. 106—56)

The present invention relates to a mineral-bound material which is surprisingly suitable as both hydrophilic and open-pored material which is not wettable by melts, for the lining and manufacture of structural parts, for instance slag troughs or crucibles, such as required in the manufacture of foamed slags as described, for instance, in U.S. pat. appln. S.N. 815,715, filed on May 25, 1959, in the name of Franz Rodis et al. for "Process and Device for the Production of a Highly Porous Mass From Slag," now abandoned, or for the transportation of molten agents.

The slag foaming processes consist essentially therein that molten slags are conducted on supports which, owing to their nature, for instance, porosity, or bores provided therein, warrant contact with water or steam. In order to prevent adherence of the slag and thus unavoidable progressive destruction of the support, one either operates with an excess of water (in this way impairment of the quality of the foamed slag) or preferably one uses porous carbon which, as is known, is not wetted by mineral melts. These plates and boards which can be obtained from industry consist of coal or coke particles which are held together by a carbon structure (coking residues), tar and pitch serving for instance as binder in the manufacture.

It has now been found that in practice individual carbon plates or boards are now and again hydrophobic and do not take up water at all or only at limited places. This phenomenon leads to considerable difficulties in operation, including a rapid destruction of the carbon plate, etc., due to thermal overstressing.

It has now been found that a mixture of water with coke of different particle size and a hydraulic binder, for instance, cement, after hardening is excellently well suited for the manufacture of such carbon boards or in general for the lining of structural parts such as required in the foaming and transportation of slag. In this connection, it was surprisingly found that despite the mineral components, no adherence or baking together of the slags or melts is observed.

Aluminous cement is a very satisfactory inorganic hydraulic binder material. The coke content of the material can range from 710–1020 parts by weight while the hydraulic binder cement content can be 100–600 parts by weight.

As a result of the capillary activity and ideal wettability of the mineral bonding structure by water, the parts prepared from the material of the invention are always hydrophilic. The carbon contained in the material prevents in this connection adherence of the slag, since carbon is not wetted in particular by molten mineral substances.

By the possibility of changing the particle sizes of the coke within wide limits, and by adjustable compression, the porosity of the material can easily be influenced. In this connection, it is furthermore found favorable that for instance coke has a natural porosity.

Difficulties arising from clogging of the pores, such as are due in the case of carbon plates to the chemical reactions, which cannot be entirely eliminated, at the phase boundary of the water-containing lining and the molten slag and to the increase in concentration of the soluble compounds produced thereby as a result of the periodic impoverishing of the lining in water, are of no importance in view of the cheapness of the mineral in accordance with the invention.

In the case of linings on which the molten slag is foamed, the pore volume, regardless of the reduction in strength necessarily inherent therein, must be relatively large in order for a sufficiently large supply of impregnation water to be stored and to be able to diffuse, as it is consumed, rapidly to the surface of the lining covered by the slag.

Upon the lining of slag troughs or crucibles which serve for transportation on the other hand, the pore volume should be small so that a more favorable behavior with respect to wear is obtained by the substantially greater strength. A certain porosity, however, must be present here also so that the escape of the vapor coming from the water of hydration of the hydraulic binder structure is not impeded and bursting is avoided.

By the selection of suitable types of coke and cement, and by varying the particle size composition and suitable compressing of the mixture, the strength of the material can be varied, in which connection the amount of cement, as in the case of ordinary concrete, is of decisive importance with regard to the required strength and imperviousness.

The material is manufactured and worked in the same way as a traditional tamped concrete. In this connection, one either produces in permanent form parts, for instance plates, which after setting are installed in the form of finished parts, or else the carbon concrete which is still in plastic form is worked as a tamping compound to produce linings, for instance of slag troughs or crucible bottoms. The insertion of a reinforcement of steel for instance has proven excellent in both cases.

In addition to these technological advantages, there are also advantages of an economic nature which result from the lower price of the material of the invention, and its simple manufacture and working, with optimum possibilities of adaptation to the requirements present in each case.

The following examples serve to illustrate the invention, but they are not intended to limit it thereto:

Example 1

Lining material for structural parts for the manufacture and transportation of foamed slags:

|  | Cement content, kg./m.$^3$ | Water/cement | Dry weight, kg./m.$^3$ | Compressive strength, kg./cm.$^2$ |
|---|---|---|---|---|
| 100% by vol. coke, 1–2 mm | 300 | 0.50 | 1,010 | 60 |
| Do | 400 | 0.45 | 1,090 | 90 |
| 100% by vol. coke, 0.5–1 mm | 300 | 0.65 | 1,090 | 50 |
| Do | 400 | 0.55 | 1,140 | 80 |
| 40% by vol. coke, 0.5–1 mm<br>60% by vol. coke, 1–2 mm | 300 | 0.55 | 1,090 | 70 |
| 40% by vol. coke, 0.5–1 mm<br>60% by vol. coke, 1–2 mm | 400 | 0.50 | 1,150 | 100 |
| 100% by vol. coke, 0.2–4 mm | 400 | 0.40 | 1,150 | 100 |

Example 2

Lining material for structural parts for the transportation of melts:

| | Cement content, kg./m.$^3$ | Water/ cement | Dry weight, kg./m.$^3$ | Compressive strength, kg./cm.$^2$ |
|---|---|---|---|---|
| 100% by vol. coke, 0-2 mm | 400 | 0.50 | 1,250 | 120 |
| 50% by vol. coke, 0-0.5 mm<br>50% by vol. coke, 0.5-1 mm | 400 | 0.65 | 1,420 | 170 |

In the following table, there is shown the influence of the carbon size on the pore volume and thus on the water-absorption of a few carbon-concretes.

| Coke particle size in mm. | Dry weight, kg./m.$^3$ (105° C.) | Water absorption | | Pore volume, percent by vol. |
|---|---|---|---|---|
| | | Percent by wt. | Percent by vol. | |
| 1.0-2.0 | 1,090 | 36 | 39 | 50 |
| 0.5-2.0 | 1,150 | 31 | 36 | 48 |
| 0.5-1.0 | 1,160 | 29 | 34 | 46 |
| 0.2-1.0 | 1,160 | 26 | 30 | 45 |
| 0.0-2.0 | 1,250 | 23 | 29 | 42 |
| 0.0-1.0 | 1,420 | 16 | 23 | 33 |

In the production of these carbon concretes, approximately the same compacting work was done.

We claim:

A method of providing a protective layer of water vapor between molten slag and a refractory lining material comprising maintaining the molten slag in contact with a hydrophilic compressed refractory lining material consisting essentially of 710–1020 parts by weight of granular coke having a particle size of about 0 to about 4 mm., and 100–600 parts by weight of an aluminous cement, said material having a pore volume of at least 33 percent by volume, said protective layer being provided during the manufacture of foamed slag and the water vapor being produced from the contact of the molten slag with water diffusing to the surface of the refractory lining material from water impregnated in the refractory lining material.

References Cited by the Examiner

UNITED STATES PATENTS 2,684,913  7/1954  West ---------------- 106—64
2,778,160  1/1957  Gallai-Hatchard.

FOREIGN PATENTS 646,524  11/1950  Great Britain.

TOBIAS E. LEVOW, *Primary Examiner.*

JOSEPH REBOLD, *Examiner.*

J. B. EVANS, J. POER, *Assistant Examiners.*